United States Patent
Basir

(10) Patent No.: US 11,151,656 B2
(45) Date of Patent: *Oct. 19, 2021

(54) RECORDING AND REPORTING OF DRIVING CHARACTERISTICS USING WIRELESS MOBILE DEVICE

(71) Applicant: Appy Risk Technologies Limited, Cheshire (GB)

(72) Inventor: Otman A. Basir, Waterloo (CA)

(73) Assignee: APPY RISK TECHNOLOGIES LIMITED, Cheshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/361,667

(22) Filed: Nov. 28, 2016

(65) Prior Publication Data

US 2017/0301029 A1    Oct. 19, 2017

Related U.S. Application Data

(63) Continuation of application No. 12/126,045, filed on May 23, 2008, now Pat. No. 9,519,905.

(Continued)

(51) Int. Cl.
*G06Q 40/08* (2012.01)
*H04W 4/48* (2018.01)
(Continued)

(52) U.S. Cl.
CPC ............ *G06Q 40/08* (2013.01); *G01C 21/20* (2013.01); *G01C 21/3492* (2013.01);
(Continued)

(58) Field of Classification Search
CPC ........ G06Q 40/08; G06Q 10/04; G06Q 30/02; G01S 19/13; G01S 5/02; G07C 5/008;
(Continued)

(56) References Cited

U.S. PATENT DOCUMENTS 5,825,283 A * 10/1998 Camhi ................. B60R 25/102
340/438
6,553,308 B1    4/2003 Uhlmann et al.
(Continued)

FOREIGN PATENT DOCUMENTS

| WO | 02082405 | 10/2002 |
|---|---|---|
| WO | 2004113842 | 12/2004 |

(Continued)

OTHER PUBLICATIONS

Mobile Phone Location Determination and Its Impact on Intelligent Transportation Systems, Yilin Zhao, IEEE Transactions on Intelligent Transportation Systems, vol. 1, No. 1, Mar. 2000.

(Continued)

*Primary Examiner* — Mary Cheung
(74) *Attorney, Agent, or Firm* — Carlson, Gaskey & Olds, P.C.

(57) ABSTRACT

A system and method for monitoring a vehicle uses a wireless mobile device. The wireless mobile device, such as a cell phone, smart phone, PDA, etc., includes some of the hardware that could be utilized to monitor and analyze data and transmit the data (or summaries, statistics or analyses of the data) to a central server. This can greatly reduce the overall cost of the system. The data can be used to determine an insurance rate or as a speed probe for creating traffic maps, for example.

31 Claims, 3 Drawing Sheets

Related U.S. Application Data

(60) Provisional application No. 61/041,944, filed on Apr. 3, 2008, provisional application No. 60/939,844, filed on May 23, 2007.

(51) Int. Cl.

| | | |
|---|---|---|
| *H04W 4/029* | (2018.01) | |
| *G01C 21/20* | (2006.01) | |
| *G06Q 10/04* | (2012.01) | |
| *G07C 5/00* | (2006.01) | |
| *G07C 5/08* | (2006.01) | |
| *H04W 4/02* | (2018.01) | |
| *G01C 21/36* | (2006.01) | |
| *G01C 21/34* | (2006.01) | |
| *G08G 1/01* | (2006.01) | |
| *G06Q 30/02* | (2012.01) | |
| *G01S 19/13* | (2010.01) | |
| *G01S 5/02* | (2010.01) | |
| *G08G 1/015* | (2006.01) | |

(52) U.S. Cl.
CPC .......... *G01C 21/3691* (2013.01); *G01S 19/13* (2013.01); *G06Q 10/04* (2013.01); *G06Q 30/02* (2013.01); *G07C 5/008* (2013.01); *G07C 5/0858* (2013.01); *G08G 1/012* (2013.01); *H04W 4/027* (2013.01); *H04W 4/029* (2018.02); *H04W 4/48* (2018.02); *G01S 5/02* (2013.01); *G08G 1/015* (2013.01)

(58) Field of Classification Search
CPC .............. G07C 5/0858; G01C 21/3691; G01C 21/3492; G01C 21/20; G08G 1/012; G08G 1/015; H04W 4/48; H04W 4/029; H04W 4/027
See application file for complete search history.

(56) References Cited

U.S. PATENT DOCUMENTS

| | | | |
|---|---|---|---|
| 6,556,905 B1 | 4/2003 | Mittelsteadt et al. | |
| 6,564,127 B1 | 5/2003 | Bauerle et al. | |
| 6,615,130 B2 | 9/2003 | Myr | |
| 6,862,524 B1* | 3/2005 | Nagda | G01C 21/3492 |
| | | | 340/988 |
| 6,931,309 B2 | 8/2005 | Phelan et al. | |
| 7,082,359 B2 | 7/2006 | Breed | |
| 7,113,127 B1 | 9/2006 | Banet et al. | |
| 7,117,075 B1 | 10/2006 | Larschan et al. | |
| 7,343,306 B1 | 3/2008 | Bates et al. | |
| 7,853,404 B2 | 12/2010 | Allen | |
| 2002/0095249 A1 | 7/2002 | Lang | |
| 2003/0233190 A1* | 12/2003 | Jones | G06Q 10/08 |
| | | | 701/465 |
| 2004/0153362 A1* | 8/2004 | Bauer | G06Q 40/02 |
| | | | 705/4 |
| 2004/0192352 A1 | 9/2004 | Vallstrom | |
| 2004/0209601 A1 | 10/2004 | Obradovich et al. | |
| 2004/0220721 A1 | 11/2004 | Chiang | |
| 2005/0060118 A1 | 3/2005 | Pavel et al. | |
| 2006/0286989 A1* | 12/2006 | Illion | G06Q 10/109 |
| | | | 455/456.3 |
| 2007/0032225 A1 | 2/2007 | Konicek et al. | |
| 2008/0064446 A1* | 3/2008 | Camp | H04M 1/66 |
| | | | 455/565 |

FOREIGN PATENT DOCUMENTS

| | | |
|---|---|---|
| WO | 2007044881 | 4/2007 |
| WO | 2007128119 | 11/2007 |
| WO | 2008134888 | 11/2008 |

OTHER PUBLICATIONS

ITR: Scalable Location-Aware Monitoring (SLAM) Systems, Massachusetts Institute of Technology, Nov. 9, 2001.
Partial European Search Report for European Application No. 16154427.5 dated Sep. 7, 2016.
Extended European Search Report for European Application No. 08757123.8 dated Jan. 16, 2012.
International Search Report and Written Opinion for PCT No. PCT/CA2008/000982 dated Sep. 17, 2008.
Business Briefing: Global Automotive Manufacturing & Technology, The Future of Automotive Telematics a report by Dr. Egil Juliusson, 2003.
ASA, Telematics, Past Present and Future, retrieved from www.ASAshop.org, May 2008.
Drivers are set to take greater control of their motor insurance and save up to one third on theur premiums with the launch of "Pay As You Drive" insurance from Norwich Union, https://www.aviva.com/newsroom/news-releases/2006/10/uk-norwich-un/, Oct. 4, 2006.
Extended European Search Report for European Application No. EP20192127.7 dated Mar. 29, 2021.

\* cited by examiner

RECORDING AND REPORTING OF DRIVING CHARACTERISTICS USING WIRELESS MOBILE DEVICE

This application is a continuation of U.S. Non-Provisional application Ser. No. 12/126,045 filed May 23, 2008, which claims priority to U.S. Provisional Application Ser. Nos. 60/939,844 and 61/041,944 filed May 23, 2007 and Apr. 3, 2008, respectively.

BACKGROUND OF THE INVENTION

This invention relates to a device and method for recording driving characteristics. More importantly, this invention relates to a method and device for recording driving characteristics utilized to monitor and compile vehicle usage data for determining an insurance premium.

It has been proposed that vehicle insurance companies could determine insurance premiums based upon information gathered by in-vehicle sensors that indicate where the vehicle was driven, how fast the vehicle was driven, times of day and days of the week, etc. Generally, these systems have required a relatively significant cost for the required in-vehicle hardware.

SUMMARY OF THE INVENTION

The present invention provides a system and method for monitoring a vehicle using a wireless mobile device. The wireless mobile device, such as a cell phone, smart phone, PDA, etc., includes some of the hardware which could be utilized to monitor and analyze data and transmit the data (or summaries, statistics or analyses of the data) to a central server. This greatly reduces the overall cost of the system and provides other benefits.

These and other features of the application can be best understood from the following specification and drawings, the following of which is a brief description.

DETAILED DESCRIPTION OF THE PREFERRED EMBODIMENT

Figure 1:
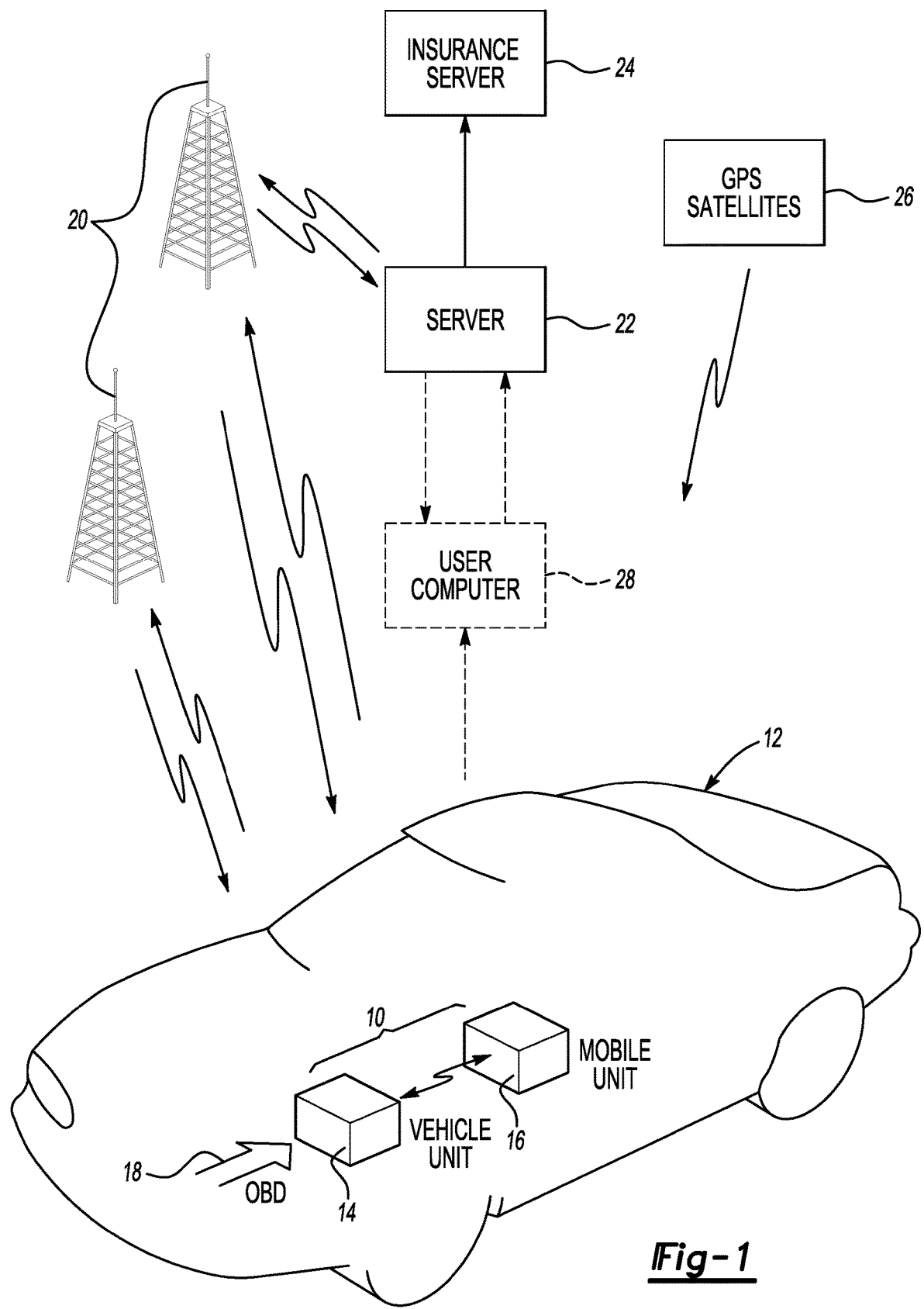
FIG. 1 is a schematic view of the vehicle monitoring system according to the present invention.

Referring to FIG. 1, a system 10 for monitoring a vehicle 12 includes a vehicle unit 14 installed in the vehicle 12 and a mobile unit 16, which is carried by a user. The vehicle unit 14 receives power from the vehicle 12 and receives vehicle operating data from a vehicle bus 18, such as an OBD-II port. The vehicle unit 14 and mobile unit 16 communicate with one another wirelessly via any encrypted or secure wireless communication protocol, such as Bluetooth. As will be explained in more detail below, in general, the system 10 determines a location of the vehicle, speed, acceleration, engine conditions, etc. and transmits this data via cell towers 20 (or other wireless transceivers) to a server 22. The server 22 collects and analyzes the data from the system 10 and forwards summaries, statistics and/or analyses, or rate levels based upon the data, to an insurance server 24, which determines an insurance premium for the vehicle 12 based upon the information from server 22.

The system 10 may sample and send the data to the server 22 periodically (between once per second to once per minute or so), or the system 10 may accumulate data and then send the data to the server 22 periodically (every few minutes to every hour). Alternatively, the system 10 may accumulate the data and then process the data to generate summaries (e.g. trip summaries), statistics (averages, etc) and/or indications of events, such as exceeded speed limits, hard accelerations, hard braking, hard lateral accelerations, changes in rate level geographical locations, etc. Additionally, or alternatively, the system 10 could transmit to the server 22 as triggered by the occurrence of such events—accidents in particular—and additional events, such as engine start/engine stop. The server 22 could also send a request to the system 10 for information (such as a full upload of all collected information, summaries, or other information). For example, if the user reports that the vehicle 12 is stolen, then the server 22 can send requests to the system 10 to transmit the location, speed and heading of the vehicle 12.

An optional user computer 28 connects to the server 22 via a wide area network, such as the internet, for uploading data from the system 10 (or summaries, statistics and/or analyses of the data) or downloading such information from the server 22. The user computer 28 can also display to the user usage summaries, statistics and analyses indicating to the user the cost of the insurance premium, suggestions for reducing the insurance premium, trip summaries, other vehicle events, etc. Alternatively, mobile devices 16 with sufficient computing power and displays could perform these functions just as a user computer 28.

The location of the vehicle 12 may optionally be determined by the system 10 based upon the information from GPS satellites 26 or by the cell towers 20.

Figure 2:
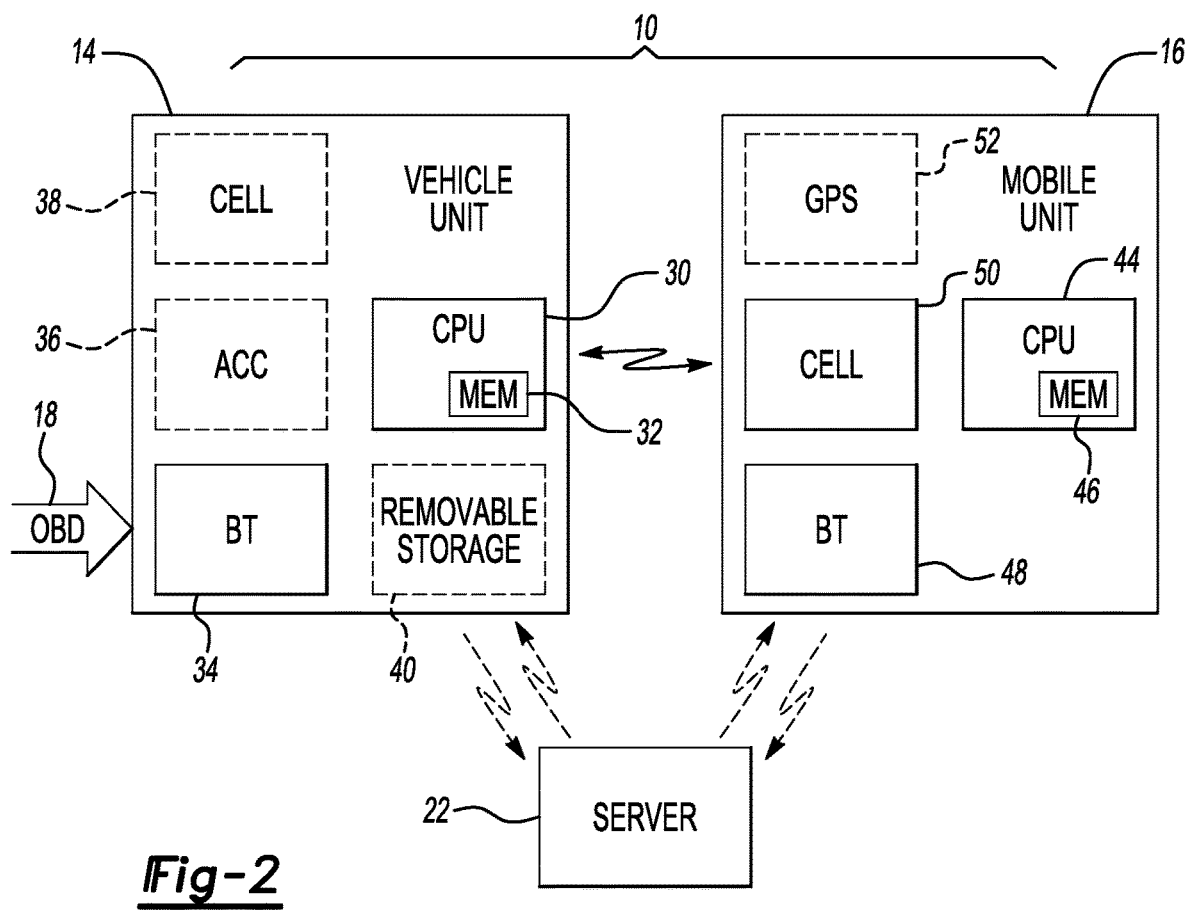
FIG. 2 is a more detailed schematic of the vehicle unit and mobile unit of FIG. 1.

As shown in FIG. 2, the hardware and software within the system 10 can be distributed between the vehicle unit 14 and the mobile unit 16 in many different ways. Preferably, if the user's mobile unit 16 (i.e. the user's cell phone, smart phone, PDA, etc.) includes more hardware and capability, more of the functions are shifted to the mobile unit 16, such that the hardware on the vehicle unit 14 can be reduced, thus saving cost and simplifying the installation. The vehicle unit 14 is connected to the vehicle bus 18 from which it can receive the vehicle identification number (VIN), and vehicle operating data, such as odometer, speed, and vehicle diagnostic information. The vehicle unit 14 includes a CPU 30 having memory 32 storing data and instructions for performing the functions described herein. The vehicle unit 14 further includes a wireless communication circuit 34, such as a Bluetooth communication circuit (other communication protocols could also be utilized). The vehicle unit 14 further includes (optionally) an accelerometer 36, which is preferably a three-axis accelerometer for measuring vehicle acceleration, including lateral acceleration of the vehicle. Optionally, the vehicle unit 14 includes a cell phone communication circuit 38, such as a GPRS circuit or other cell or satellite communication protocol. Optionally, the vehicle unit 14 includes a removable storage 40, such as an SD card, USB key, etc. such that data can be transferred between the vehicle unit 14 and the user computer 28 (FIG. 1).

Again, the mobile unit 16 is preferably a cell phone, smart phone, or wireless-capable PDA or similar portable electronic device with a processor and wireless communication ability. The mobile unit 16 includes a CPU 44 having a memory 46 for storing data and instructions, which when executed by the CPU 44 perform the features described herein. The mobile unit 16 includes a wireless communication circuit 48, such as a Bluetooth communication circuit or other wireless communication protocol. The mobile unit 16 includes a cell phone circuit 50, such as a GPRS circuit or other wireless cell or satellite phone communication circuitry. The mobile unit 16 may optionally include a GPS receiver 52, which indicates to the CPU 44 a current location of the mobile unit 16 relative to Earth. Part of the benefit of the present invention is that many such commonly-available mobile units 16 already include much of this hardware and have sufficient storage and processing power to perform the functions described herein.

In one implementation of the embodiment shown in FIG. 2, the CPU 30 of the vehicle unit 14 accumulates vehicle operating data from the vehicle bus 18, the accelerometer 36, and from the mobile unit 16. When the vehicle unit 14 detects the presence of the mobile unit 16 and recognizes the mobile unit 16 as a previously registered mobile unit 16 associated with an authorized, insured user of the vehicle 12, the vehicle unit 14 identifies an associated user of the mobile unit 16 as the current driver of the vehicle 12 and begins communicating with the mobile unit 16. If more than one registered mobile unit 16 are detected (e.g. a husband and wife traveling together), the vehicle unit 14 assumes that the user designated the primary driver is driving the vehicle 12 (optionally subject to manual override via a user interface on the mobile units 16). Mobile units 16 could be registered for more than one vehicle 12 (again, e.g., a husband and wife both registered on each other's vehicles 12).

The vehicle unit 14 receives GPS location information from the GPS receiver 52 of the mobile unit 16 (if included). Alternatively, or when GPS is not available, the location of the mobile unit 16 can be determined based upon the communication circuit 50 in the mobile unit 16 being detected by nearby cell towers 20 using cell tower triangulation (such techniques are well known). This location is provided to the mobile unit 16 and in turn relayed to the vehicle unit 14. Thus, the mobile unit 16 can provide any or all of the following information to the vehicle unit 14: GPS location, cell tower triangulation location, identification of a driver of the vehicle 12 (by identifying the mobile unit 16). The mobile unit 16 also provides a way for the vehicle unit 14 (if not provided with its own cell communication circuit 38) a way to send information to the server 22 via the cell tower 20. If the vehicle unit 14 is provided with a cellular communication circuit 38, then the location of the vehicle unit 14 can be provided directly based upon cell tower triangulation.

Figure 3:
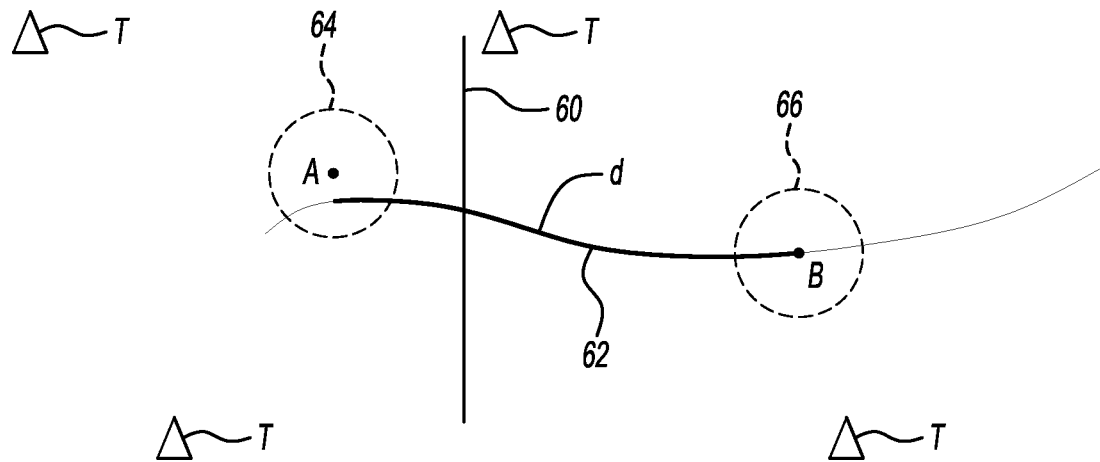
FIG. 3 illustrates one technique for determining vehicle location based upon cell phone triangulation.

FIG. 3 illustrates a method for improving the accuracy of the cell tower triangulation location determination. As is known, the location of the mobile device 16 can be determined by the server 22 via a plurality of cell towers 20 using triangulation. This location is generally accurate only to within a radius of two-hundred feet (currently). As the vehicle 12 is driven by a driver carrying a mobile device 16 along roads 60, 62, the server 22 first determines the mobile device 16 to be within a general area 64 having a center A. This is done using triangulation from cell towers 20. At some later time, the position of the mobile unit 16 is determined to be within general area 66 having a center B utilizing triangulation from cell towers 20 (which may be the same towers 20, a subset of towers 20, completely different towers 20 or some same and some different towers 20).

During that time between point A and point B, the vehicle bus 18 indicates to the vehicle unit 14 that the vehicle 12 has traveled a distance d. The travel distance d is very accurate, and is much more accurate than the triangulated positions A, B. However, using the raw triangulation data used to calculate the positions A, B in combination with the relatively accurate travel distance d (and, optionally, speed and acceleration, all of which are accurately measured on the vehicle) the positions solutions A, B can be recalculated with significantly increased accuracy. Preferably, the calculation is done using the same cell towers 20 for position A and position B, but it does not have to be the same cell towers 20. To the extent that the road is curved, the curved segments will be approximated as a sequence of linear segments.

Figure 4:
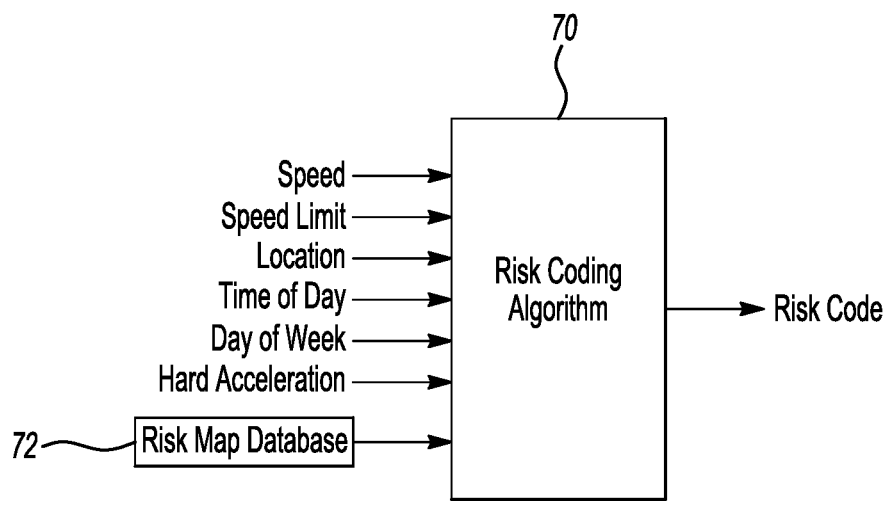
FIG. 4 illustrates a risk coding algorithm that could be used with the monitoring system of FIG. 1 and FIG. 2.

Referring to FIG. 4, for any of the embodiments or alternatives described herein, the data may be gathered and used as shown. Generally, a risk coding algorithm 70 receives the vehicle operating data, such as vehicle location (as determined by GPS or cell tower triangulation or the improved cell tower triangulation calculation described above or any other sensors), vehicle speed, current speed limit (as determined for the current vehicle location from a map database of speed limits), time of day, day of the week, hard accelerations (including hard braking, lateral accelerations), etc. Risk coding algorithm 70 could be performed on server 22 (after which the underlying data may be discarded to preserve privacy), on the vehicle unit 14, on the mobile unit 16 or on the user computer 28.

A risk map database 72 includes risk ratings for a plurality of geographical areas (e.g. zip codes). The risk map database 72 may include more than one risk rating for each geographical area, such that different risk ratings are applicable for different times of day or days of the week. The risk rating mapping is many to one, meaning that many different geographical areas will have the same risk rating.

In a simplest example, the risk code generated by the risk-coding algorithm could be based solely on time spent in each geographical area and the associated risk ratings for those geographical areas. The risk code could be simply an indication of how much time (or what times of day) the vehicle was in areas of certain risk ratings. For example, the risk code could indicate that the vehicle was in a zone of risk rating 4 between 4:00 and 5:00, in a zone of risk rating 10 between 5:00 and 5:35, and in a zone of risk rating 1 between 5:35 and 6:00. This resultant risk code information could be used by the insurance company to determine insurance rates, while preserving some privacy for the user. Because the risk ratings are many-to-one, it is not possible to determine exactly where the user was during these times.

In another example, additional information, such as speed (or speed as compared to current speed limit), time of day, day of the week, hard acceleration information, etc. could all be input into the risk-coding algorithm 70. The durations of each condition affecting insurance cost are also used in the risk-coding algorithm 70. The resultant risk code output is simply an associated insurance cost factor. The insurance cost charged to the user for the vehicle is then determined by the insurance server 24 as a function of the risk code and optionally any other permanent information stored on the insurance server 24 (such as the user's age, the type of vehicle, the user's driving record, etc). By combining several different types of information in the risk-coding algorithm 70 prior to sending the risk code to the insurance server 24 (or, if calculated on the server 24, prior to storing on the server 24 and discarding the underlying data), the specific information that may intrude on the user's privacy is obscured.

Returning back to FIG. 2, in another implementation of the embodiment shown in FIG. 2, the accumulation of vehicle operating data and generation of summaries, statistics and/or analyses could be primarily performed on the mobile unit 16 instead of the vehicle unit 14. Thus, once the mobile unit detects that it is near the vehicle unit 14, it begins receiving vehicle operating data from the vehicle unit 14, including odometer, speed, acceleration (which may be calculated by the vehicle unit 14 based upon speed). The mobile unit 16 identifies the vehicle 12 in which it is operating based upon the VIN received from the vehicle unit 14. In this implementation, the mobile unit 16 may directly have its location via the GPS receiver 52 and/or cell tower triangulation of its cell phone communication circuit 50 (as transmitted by server 22). This could minimize the amount of hardware necessary in the vehicle unit 14 and reduce the competing power necessary for the CPU 30 in the vehicle unit 14.

In the event that the vehicle 12 is driven in the absence of the mobile unit 16 (or some other registered, authorized mobile unit 16), the vehicle unit 14 first notifies the unknown driver audibly and/or via LED lights that the mobile unit 16 is not connected (for example, in case the mobile unit 16 is simply off, or the driver has simply forgotten the mobile unit 16 and can still retrieve it). The vehicle unit 14 then accumulates in memory 32 as much vehicle operating data as it has available as the vehicle 12 is driven. For example, the vehicle unit 14 can accumulate engine-on and engine-off occurrences, each of which is designated as a "trip." The vehicle unit 14 also accumulates speeds during each trip from the vehicle bus 18, and distance traveled during each trip. If the vehicle unit 14 includes an accelerometer 36, the vehicle unit 14 records accelerations during the trips. When the mobile unit 16 is subsequently brought into the proximity of the vehicle unit 14, the mobile unit 16 compares previously stored information from the vehicle unit 14 to the currently stored information on the vehicle unit 14, including current odometer reading. The mobile unit 16 also compares the last stored location of the vehicle unit 14 that was stored on the mobile unit 16 and compares it to the currently determined location of the vehicle unit 14, as determined by the mobile unit 16. Discrepancies indicate to the mobile unit 16 that the vehicle 12 was operated without the mobile unit 16. In that case, the mobile unit 16 retrieves the information accumulated by the vehicle unit 14 in the absence of the mobile unit 16. This information is transmitted by the mobile unit 16 to the server 22 and is flagged as operation of the vehicle 12 without the mobile unit 16. For example, it is anticipated that exact location of the vehicle 12 in the absence of the mobile unit 16 would not be known. Therefore, it would not be known exactly where the vehicle 12 was driven during the trips without the mobile unit 16. It is anticipated that a certain level of driving without the presence of the mobile unit 16 would be acceptable to the insurance server 24; however, certain amounts of distances driven or the percentage of distance driven without the presence of the mobile unit 16 might increase the rate of insurance on insurance server 24 or disqualify the user from a monitored insurance rate based program.

Each time the mobile unit 16 disconnects from the vehicle unit 14 (such as when the user leaves the vehicle 12 and/or when the engine is turned off), the mobile unit 16 and the vehicle unit 14 each store the last odometer and the last location of the vehicle 12. This information can be used by the mobile unit 16 to determine whether the vehicle 12 was moved in the absence of the mobile unit 16. Further, this information can be used to find the vehicle 12, such as in a large parking lot. On the mobile unit 16, the user can select an option to recall the last known location of the vehicle 12 and be guided (such as by arrows and distances or headings and distances) to the last known location of the vehicle 12.

Additionally, if the vehicle 12 is driven without the mobile unit 16, the vehicle unit 14 can propagate its position using the stored last location as a starting point and using its speed and odometer information (for distance) and three-axis accelerometer 36 (for heading). This information can be used to generate a rough trip history, which may be sufficient to indicate a general location to which the vehicle 12 was driven. For example, it may be sufficient to determine that the vehicle 12 has been driven to a region with a different insurance rate level. Or, if the vehicle 12 is stolen, this information can be transmitted from the vehicle 12 to the server 22 (upon request from the server) to assist in locating the stolen vehicle 12.

Referring once again to FIG. 1, the system 10 can also function as a speed probe for a traffic monitoring system (while simultaneously meeting the purposes described above or not). As a speed probe, the speed and location of many vehicles 12 is transmitted by their systems 10 to the server 22. Current speed probes use cell tower triangulation to estimate car speed and hence traffic conditions; others may use GPS to do the same. Both are inaccurate and erroneous as traffic estimation can be erroneously computed due to pedestrian cell phones or in parked cars, or people riding bicycles and carrying cell phones. With the present invention, the system 10 obtains actual speed from the vehicle 12 (from vehicle bus 18), which is much more accurate than the cell tower triangulation. Also, the system 10 provides GPS location, which is also more accurate, but even if the location is based upon cell tower based estimated location, at least there is no doubt that the speed information is from a vehicle 12 and not just from a pedestrian or bicyclist cell phone. The server 22 obtains data unobtrusively from many systems 10 in many vehicles 12, maps their locations and speeds onto roadways to compile traffic maps.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of monitoring a vehicle including the steps of:
   a) determining that a cell phone is near the vehicle;
   b) determining a location of the cell phone;
   c) determining a location of the vehicle based upon said steps a-b);
   d) determining speed information of the vehicle; and
   e) wirelessly sending the vehicle speed information and the location of the vehicle to a server from the cell phone.

2. The method of claim 1 wherein said cell phone is a smart phone that includes a GPS receiver.

3. The method of claim 1 further including the step of determining a cost of insurance based upon said step c).

4. The method of claim 1 further including the step of receiving on the smart phone vehicle operating data from the vehicle.

5. The method of claim 1 wherein said step a) is performed based upon a wireless communication between a vehicle unit in the vehicle and the mobile unit.

6. The method of claim 5 further including the steps of accumulating in the smart phone acceleration information from an accelerometer in the vehicle unit, and transmitting the acceleration information to the server with the smart phone.

7. The method of claim 5 further including the step of recognizing the mobile device as a previously registered mobile device associated with an insured user of the vehicle.

8. The method of claim 1 further including the step of recognizing the mobile device as a previously registered mobile device associated with an insured user of the vehicle.

9. The method of claim 8 wherein said step a) is performed based upon a wireless communication between a vehicle unit installed in the vehicle and the mobile unit.

10. The method of claim 9 further including the steps of receiving in the smart phone acceleration information from an accelerometer in the vehicle unit, and transmitting the acceleration information to the server with the smart phone.

11. The method of claim 10 further including the step of identifying the user of the mobile device as a current driver of the vehicle.

12. A smart phone for monitoring a vehicle comprising, wherein the smart phone includes a GPS receiver, wherein the smart phone is programmed to:
   determine that the smart phone is near a vehicle;
   determine a location of the smart phone; and
   monitor operation of the vehicle based upon a determination that the smart phone is near the vehicle.

13. The smart phone of claim 12 wherein the smart phone is programmed to monitor vehicle operating data.

14. The smart phone of claim 13 wherein the smart phone is programmed to receive vehicle operating data from the vehicle.

15. The smart phone of claim 13 wherein the smart phone is programmed to send vehicle speed information to a server.

16. The smart phone of claim 12 wherein the smart phone is programmed to send the location of the smart phone to the server based upon the determination that the smart phone is near the vehicle.

17. The smart phone of claim 12 wherein the smart phone is further programmed to receive vehicle operating data from a vehicle unit installed in the vehicle, and to transmit the vehicle operating data to a server.

18. The smart phone of claim 17 wherein the vehicle operating data includes acceleration data.

19. The smart phone of claim 12 wherein the smart phone is programmed to determine that the smart phone is near the vehicle by communicating wirelessly with a vehicle unit installed in the vehicle.

20. A computer readable medium storing instructions which when executed by a smart phone perform the steps of:
   a) determining that the smart phone is near an associated vehicle;
   b) determining a location of the smart phone;
   c) determining a location of the vehicle based upon said steps a-b); and
   d) wirelessly transmitting the location of the vehicle determined in said step c) to a remote server.

21. A method of monitoring a driver of a vehicle with a smart phone including the steps of:
   a. associating a driver with a smart phone;
   b. determining that the smart phone is in a vehicle;
   c. determining a location of the smart phone while in the vehicle;
   d. determining vehicle speed information of the vehicle after said step b);
   e. accumulating the vehicle speed information from said step d) and location from said step c) on the smart phone; and
   f. wirelessly sending the vehicle speed information and the location of the vehicle to a server with the smart phone.

22. The method of claim 21 further including the step of determining a cost of insurance based upon said step f).

23. The method of claim 21 further including the step of accumulating acceleration information in the smart phone and transmitting the acceleration information to the server with the smart phone.

24. The method of claim 21 further including the step of recognizing the smart phone as a previously registered smart phone associated with an insured user of the vehicle.

25. The method of claim 24 further including the step of identifying the user of the smart phone as a current driver of the vehicle.

26. A smart phone for monitoring a driver of a vehicle comprising, wherein the smart phone includes a GPS receiver, wherein the smart phone is programmed to:
   determine that the smart phone is in a vehicle;
   determine a location of the smart phone while the smart phone is in the vehicle;
   accumulate speed and location information while the smart phone is in the vehicle; and
   transmit the speed and location information to a server.

27. The smart phone of claim 26 wherein the smart phone accumulates acceleration information and transmits the acceleration information to the server.

28. The smart phone of claim 27 wherein the smart phone transmits the speed and location information to the server to calculate an insurance cost.

29. A method of monitoring a driver of a vehicle with a smart phone including the steps of:
   a. associating a driver with a smart phone;
   b. recognizing the smart phone as a previously registered smart phone associated with an insured user of the vehicle;
   c. identifying the user of the smart phone as a current driver of the vehicle;
   d. determining that the smart phone is in a vehicle based upon a wireless communication between a vehicle unit installed in the vehicle and the smart phone;
   e. determining a location of the smart phone while in the vehicle;
   f. determining vehicle speed information of the vehicle after said step b);
   g. accumulating the vehicle speed information from said step f) and location from said step e) on the smart phone; and
   h. wirelessly sending the vehicle speed information and the location of the vehicle to a server with the smart phone for use subsequently to determine a cost of insurance for the insured user of the vehicle.

30. The method of claim 29 further including the steps of receiving in the smart phone acceleration information from an accelerometer in the vehicle unit, and transmitting the acceleration information to the server with the smart phone.

31. A system for monitoring a vehicle comprising:
   a smart phone including a GPS receiver, wherein the smart phone is programmed to:
      determine that the smart phone is near a vehicle by communicating wirelessly with a vehicle unit installed in the vehicle;
      determine a location of the smart phone; and monitor operation of the vehicle based upon a determination that the smart phone is near the vehicle; and the vehicle unit configured to recognize the smart phone as a previously registered smart phone associated with an insured user of the vehicle, the vehicle unit being configured to identify the user of the associated smart phone as a current driver of the vehicle;

the system configured to:

determine a location of the vehicle directly from the gps receiver of the smart phone or from cell tower triangulation of the smart phone;

accumulate vehicle operating data from the user, including the location of the vehicle;

receive, at a risk code algorithm, said accumulated vehicle operating data for use subsequently to determine a cost of insurance for the insured user of the vehicle.

* * * * *

UNITED STATES PATENT AND TRADEMARK OFFICE
CERTIFICATE OF CORRECTION

PATENT NO. : 11,151,656 B2
APPLICATION NO. : 15/361667
DATED : October 19, 2021
INVENTOR(S) : Otman A. Basir It is certified that error appears in the above-identified patent and that said Letters Patent is hereby corrected as shown below:

In the Claims

In Claim 4, Column 6, Line 63; replace "smart phone" with --cell phone--

In Claim 5, Column 6, Line 67; replace "mobile unit." with --cell phone.--

In Claim 6, Column 7, Line 2; replace "smart phone" with --cell phone--

In Claim 6, Column 7, Line 4-5; replace "smart phone." with --cell phone.--

In Claim 7, Column 7, Line 7; replace "mobile device" with --cell phone--

In Claim 7, Column 7, Line 8; replace "mobile device" with --cell phone--

In Claim 8, Column 7, Line 10; replace "mobile device" with --cell phone--

In Claim 8, Column 7, Line 11; replace "mobile device" with --cell phone--

In Claim 9, Column 7, Line 14; replace "mobile unit." with --cell phone.--

In Claim 10, Column 7, Line 16; replace "smart phone" with --cell phone--

In Claim 10, Column 7, Line 18; replace "smart phone." with --cell phone.--

In Claim 11, Column 7, Line 20; replace "mobile device" with --cell phone--

In Claim 16, Column 7, Line 38; replace "the server" with --a server--

Signed and Sealed this
Twelfth Day of April, 2022

Drew Hirshfeld
*Performing the Functions and Duties of the
Under Secretary of Commerce for Intellectual Property and
Director of the United States Patent and Trademark Office*